No. 688,373. Patented Dec. 10, 1901.
M. F. WILCOX.
CENTERING CHUCK FOR TOOL MACHINES.
(Application filed Apr. 22, 1901.)
(No Model.)
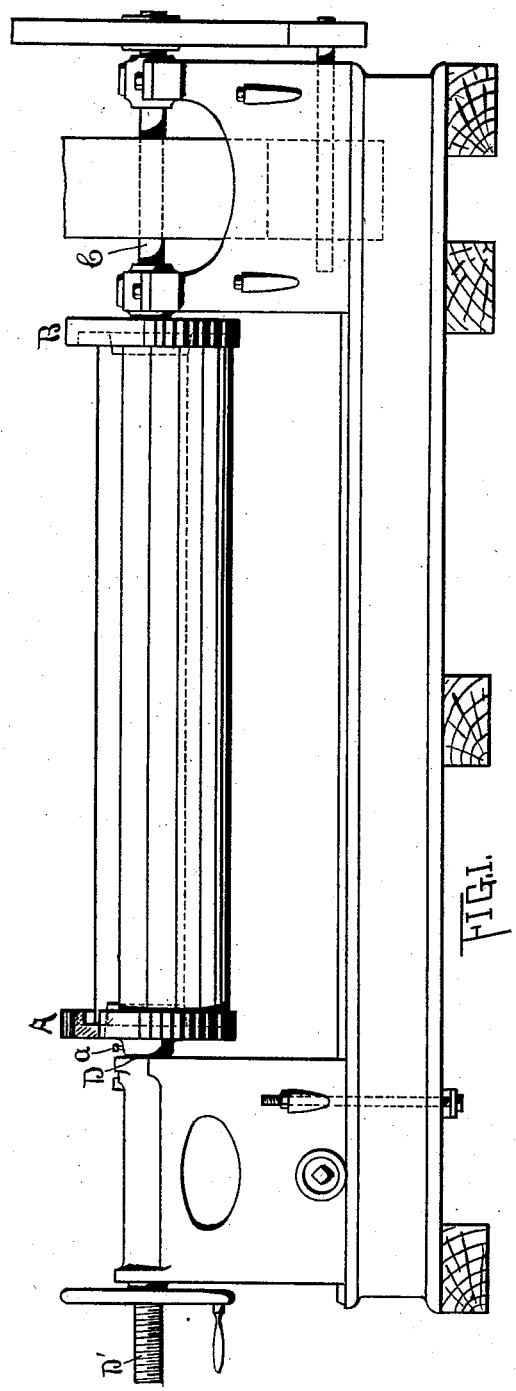
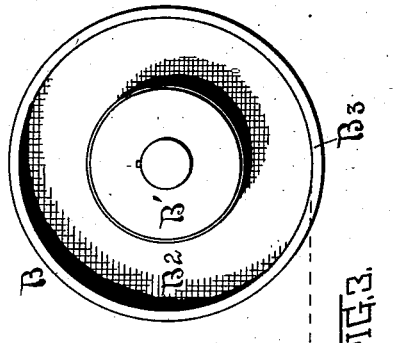
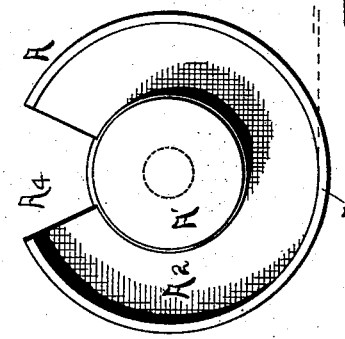
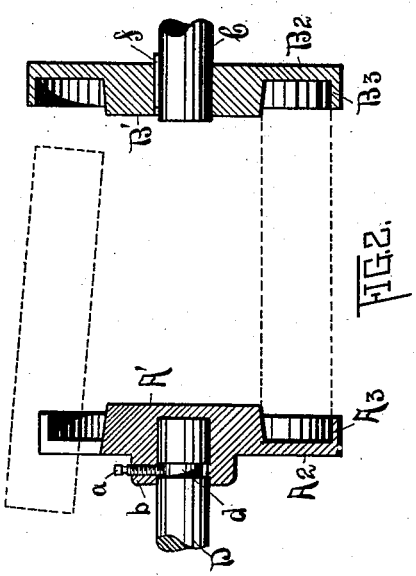
Witnesses:
Merrill F. Wilcox, Inventor.
By Geo. B. Willcox, Attorney.

United States Patent Office.

MERRILL F. WILCOX, OF BAY CITY, MICHIGAN, ASSIGNOR TO MICHIGAN PIPE CO., OF BAY CITY, MICHIGAN.

CENTERING-CHUCK FOR TOOL-MACHINES.

SPECIFICATION forming part of Letters Patent No. 688,373, dated December 10, 1901.

Application filed April 22, 1901. Serial No. 56,918. (No model.)

*To all whom it may concern:*

Be it known that I, MERRILL F. WILCOX, a citizen of the United States, residing at Bay City, in the county of Bay and State of Michigan, have invented certain new and useful Improvements in Centering-Chucks for Tube-Machines; and I do hereby declare the following to be a full, clear, and exact description of the invention, such as will enable others skilled in the art to which it appertains to make and use the same.

This invention is a pair of centering-chucks for assembling wooden tubes or pipes which are built up of a number of tapered strips and then bound together by wire wound spirally from end to end of the tube.

The objects of the invention are to provide a simple device for holding the strips in proper relative position while the tube is being built up into cylindrical form, to provide means for quickly inserting the strips, to prevent the last strip from binding while being driven into position, and to produce a pair of chucks that will not only hold the strips in position, but also rotate the built-up tube while the wire is being wound on and then quickly release the completed tube.

The invention is illustrated in the accompanying drawings, in which—

Figure 1 is a side elevation of a machine embodying my improvement, showing a tube-section partly built up. Fig. 2 is a sectional detail of the two chucks, showing the manner of inserting the strips; and Fig. 3 shows the faces of the two chucks.

As is clearly shown in the drawings, the device consists in a pair of cylindrical heads or chucks A and B. The chuck B is rigidly secured, by means of a feather $f$ or otherwise, to the rotatable head-stock spindle C of the lathe. The other chuck A revolves freely upon the end of the tail-stock spindle D and is prevented from coming off by a set-bolt $a$, tapped into the flange $b$ of the chuck. The inner end of the set-bolt $a$ travels in the circular groove $d$ of the tail-stock spindle when the chuck is rotated. The tail-stock spindle is longitudinally adjustable by means of a screw D', as in ordinary lathes, and by this means the chuck A can be traversed toward or away from the chuck B to accommodate tube-strips of different lengths. The inwardly-projecting hubs A' and B' of the chucks A and B have their outside diameters equal to the bore of the completed tube and are slightly tapered to facilitate its removal. The webs $A^2$ and $B^2$ of the chucks A and B have inwardly-turned flanges $A^3$ and $B^3$. The diameter inside the flange $B^3$ is just equal to the outside diameter of the completed tube; but the inside diameter of the flange $A^3$ is made larger than the outside diameter of the tube, as shown in Fig. 3, for a purpose which will now be explained.

When the chucks A and B have been adjusted, by means of the tail-stock spindle D, so that the inner faces of the webs $A^2$ and $B^2$ are separated a distance approximately equal to the length of the strips, the strips are assembled in the following manner: The first strip is slid horizontally through the sector-shaped opening $A^4$ of the chuck A, and its end is made to abut against the web $B^2$ and between the hub B' and the flange $B^3$ of the chuck B. The other end of the strip will have cleared the inner edge of the web $A^2$, and the strip can then be slid sidewise around the hubs A' and B' until it reaches the position indicated by the lower dotted lines in Fig. 2. Additional strips are inserted in the same manner until all except the last have been put in place. It is evident that the last strip should fit tightly between the others, and since it must be entered by sliding lengthwise it would bind with equal tightness throughout its length if the internal diameter of the flange $A^3$ were just equal to that of the flange $B^3$, causing the strip to drive hard. To permit the last strip to be inserted easily, I make the internal diameter of the flange $A^3$ enough larger than that of the flange $B^3$ to permit the last strip to enter easily between the relatively loose ends of the strips at the chuck A and to bind tightly between their opposite ends at the chuck B. With this arrangement the last strip is readily inserted by hand for the greater portion of its length and is then driven or pressed longitudinally into place with a small amount of force. When the tube has been built up by assembling the strips in the manner above described, the chuck B is revolved, turning the tube with it, and binding-wire is wound on from end to end of the tube under heavy tension, thus completing the tube. To release the tube, it is only necessary to separate the chucks A and B by drawing back the tail-stock spindle D, the tapered hubs A' and B' preventing the ends of the tube from binding.

The opening $A^4$ through one side of the freely-revoluble chuck A not only serves as a means for quickly and accurately assembling the staves in the chucks, but has also the additional advantage of always coming to rest with the opening $A^4$ uppermost ready to receive new staves as soon as a completed tube has been released.

What I claim as my invention, and desire to secure by Letters Patent, is—

1. A pair of tube-centering chucks placed opposite each other on independent spindles, one chuck being fixed to a revoluble spindle, and the other chuck revolving freely; a central inwardly-projecting hub for each chuck, the outside diameter of the hub being equal to the inside diameter of the tube; an inwardly-projecting circumferential flange for each chuck; a flat web between the hub and flange; and an opening through the web and flange of the freely-revolving chuck.

2. A pair of chucks oppositely placed on independent spindles, one of said chucks being rigidly mounted on a revoluble spindle, the other chuck being freely revoluble, an inwardly-projecting central hub for each chuck, the outside diameter of said hub being equal to the inside diameter of the tube, and tapered inwardly; a circumferential flange for one of said chucks having its inside diameter equal to the outside diameter of the tube, a similar flange for the other chuck, the inside diameter of which is greater than the outside diameter of the tube; a flat web connecting the hub and flange of each chuck; and a segmental opening through the web and flange of one chuck, substantially as described.

3. A centering and assembling device for tubes built up of strips; comprising a pair of opposing chucks, one fixed to a revoluble spindle and the other freely revoluble and movable toward or from the first chuck; said freely-revoluble chuck having an opening for the reception of strips and so balanced as to automatically bring said opening into position for receiving strips when the chuck is released.

In testimony whereof I affix my signature in presence of two witnesses.

MERRILL F. WILCOX.

Witnesses:
I. GOULD,
GEO. B. WILLCOX.

Correction in Letters Patent No. 688,373.

It is hereby certified that in Letters Patent No. 688,373, granted December 10, 1901, upon the application of Merrill F. Wilcox, of Bay City, Michigan, in the grant and headings of the printed specification and drawings the title of the invention was erroneously written and printed "Centering-Chucks for Tool-Machines," whereas the said title should have been written and printed *Centering-Chucks for Tube-Machines;* and that the said Letters Patent should be read with this correction therein that the same may conform to the record of the case in the Patent Office.

Signed, countersigned, and sealed this 31st day of December, A. D., 1901.

[SEAL.]
            F. L. CAMPBELL,
            *Assistant Secretary of the Interior.*

Countersigned:
 F. I. ALLEN,
  *Commissioner of Patents.*